US00RE43407E

(19) United States
(12) Reissued Patent
Duffy et al.

(10) Patent Number: US RE43,407 E
(45) Date of Reissued Patent: May 29, 2012

(54) RETRACTABLE HAT TETHER DEVICE

(75) Inventors: Jim E. Duffy, Tahoe City, CA (US); Bill E. Brauner, Angels Camp, CA (US)

(73) Assignee: Streamworks, Inc., Stockton, CA (US)

(21) Appl. No.: 11/786,803

(22) Filed: Apr. 11, 2007

Related U.S. Patent Documents

Reissue of:
(64) Patent No.: 6,877,168
Issued: Apr. 12, 2005
Appl. No.: 10/626,109
Filed: Jul. 23, 2003

(51) Int. Cl.
*A42B 7/00* (2006.01)

(52) U.S. Cl. ..... 2/175.7; 132/57.1

(58) Field of Classification Search ..... 2/175.6, 2/175.7, 209.13, 417, 418, 421, 422, 171.4, 2/171.5, 172, 182.2, 195.7
See application file for complete search history.

(56) References Cited

U.S. PATENT DOCUMENTS

| | | | | |
|---|---|---|---|---|
| 701,639 | A | 6/1902 | Stamm | |
| 903,037 | A | 11/1908 | Westlund | |
| 938,281 | A | 10/1909 | Shaw | |
| 1,055,676 | A | 3/1913 | Soneshein | |
| 1,601,395 | A | 9/1926 | Ishiwata | |
| 2,686,917 | A | 8/1954 | Auerbach | |
| 4,263,679 | A | 4/1981 | Erlendson | |
| 4,276,657 | A | 7/1981 | Montesi | |
| D293,043 | S | 12/1987 | Zamboni | |
| 4,991,236 | A | 2/1991 | Pritchett | |
| 4,993,079 | A | 2/1991 | Johnson | |
| 5,092,472 | A | 3/1992 | Jones | |
| 5,144,695 | A | 9/1992 | Schweizer | |
| 5,514,016 | A | 5/1996 | Larson | |
| D371,006 | S | 6/1996 | Walker et al. | |
| 5,541,816 | A | 7/1996 | Miserendino | |
| 5,611,118 | A | 3/1997 | Bibbee | |
| 5,675,841 | A | 10/1997 | Jackson | |
| 5,890,638 | A | 4/1999 | Woloshen | |
| D412,611 | S | 8/1999 | Simpson | |
| 6,079,419 | A | 6/2000 | Perlsweig | |
| 6,154,887 | A | 12/2000 | Yagi | |
| 6,314,625 | B1 * | 11/2001 | Ikeda | 24/429 |
| 6,446,265 | B1 | 9/2002 | Moreau et al. | |
| 6,560,785 | B1 * | 5/2003 | Taguchi | 2/171.1 |

* cited by examiner

*Primary Examiner* — Katherine Moran
(74) *Attorney, Agent, or Firm* — Beyer Law Group LLP

(57) ABSTRACT

A retractable hat tether apparatus for a hat having a cap portion. The tether apparatus includes a guide base movably mounted to the cap portion for movement thereof along a fixed path between a first position and a second position. A flexible tether includes a first end and an opposite second end thereof mounted to the guide base. A clip device is configured for releasable attachment to a user's clothing. The clip device is mounted to the first end such that, when the guide base moves along the fixed path between the first position and the second position, the tether and the clip device move between a retracted condition, positioning the tether substantially along the fixed path, and an extended condition, positioning the tether at an exterior of the cap portion to enable the clip device to be mounted to the user's clothing.

42 Claims, 6 Drawing Sheets

RETRACTABLE HAT TETHER DEVICE

Matter enclosed in heavy brackets [ ] appears in the original patent but forms no part of this reissue specification; matter printed in italics indicates the additions made by reissue.

FIELD OF THE INVENTION

The present invention relates to apparel tether devices, and more particularly, relates to retractable tether devices for hat wear apparel.

BACKGROUND OF THE INVENTION

Hat wear has historically been a prominent part of style and fashion. One particular style of hat apparel, visored caps, has recently become extremely popular for active outdoor wear and for casual wear. One particular problem associated with these caps, as well as with any visored head wear, is that they can become unexpectedly dislodged from the head of the user under windy conditions or extreme physical activities. This event is particularly bothersome in circumstances where recovery of the hat may not be easily accomplished, such as during sporting activities (e.g., fly fishing, snow-skiing, jet skiing, etc.) or open-air traveling (e.g., motorcycle, convertibles, speedboating, etc.).

Numerous hat retaining devices have been developed to facilitate hat recovery in the aforesaid conditions. Almost all hat retaining structure typically include a lengthy, flexible tether having a clip on one end, and some mounting structure coupling the other end to the hat or cap. One problem typically associated with these devices is that during non-use, the lengthy tether is unsupported and dangles or hangs freely. This free dangle can be quite unsightly, easily tangled or potentially hazardous to small children.

Attempts to retract the tether during non-use have been proposed in some tether devices. These assemblies, however, are either too complex, do not function adequately or significantly alter the footprint of the head wear. Accordingly, there is a need for a retractable hat tether device that eliminates the aforementioned problems.

SUMMARY OF INVENTION

The present invention provides a retractable hat tether apparatus for a hat having a cap portion. The tether apparatus includes a mounting assembly having a guide portion adapted to affix to the cap portion, and a guide base slideably mounted to the guide portion for movement thereof along a fixed path between a first position and a second position. The tether apparatus further includes a clip device is configured for releasable attachment to a user's clothing, and a flexible tether having one portion thereof mounted to the clip device, and another portion thereof mounted to the guide base. The apparatus is structured such that when the guide base moves along the fixed path between the first position and the second position, the one portion of the tether and the clip device move between a retracted condition and an extended condition. In the retracted condition, the guide base and the tether cooperate to position the tether along the fixed path, while in the extended condition, the clip device can be mounted to the user's clothing.

Accordingly, the guide portion and the guide base of the mounting assembly cooperate to position the retractable hat tether along the fixed path. This guided positioning effectively eliminates unsightly tether dangle through an efficient structure that reduces complexity and minimizes parts.

In one specific embodiment, the guide portion cooperates with the cap portion of the hat to form an elongated pocket along the fixed path upon which a substantial portion of the tether retracts into the pocket in the retracted condition, when the guide base is moved to the first position. The length of the tether is, therefore, similar to the length of travel of the guide base along the fixed path between the first position and the second position.

In another configuration, the guide portion extends substantially through a crown of the cap portion from a frontside of the cap portion to a rearside of the cap portion. The guide base may be adapted to glide along the guide portion in railing type manner. For example, in one arrangement, the mounting assembly is provided in the form of a zipper mechanism.

In another aspect of the present invention, a retractable hat tether apparatus is provided for a hat having a cap portion. The tether apparatus includes a mounting assembly having a guide portion adapted to affix to the cap portion, and a guide base slideably mounted to the guide portion for movement thereof along a fixed path between a first position and a second position. A clip device is included that is configured for releasable attachment to a user's clothing, together is a flexible tether. One portion of the flexible tether is mounted to the clip device, and another portion of the tether is mounted to the guide base. When the guide base moves along the fixed path of the guide portion, between the first position and the second position, the one portion of the tether and the clip device move between a retracted condition and an extended condition. In the extended condition, the tether is positioned outside the cap portion to enable the clip device to be mounted to the user's clothing.

In one alternative embodiment, a pull tab member is included mounted to the guide base for manual manipulation of the guide base along the fixed path. A snap device may be included which is configured to mount to the cap portion, and adapted to cooperate with the clip device for releasable mounting thereof to the cap portion.

In yet another aspect of the present invention, an entire hat assembly is provided which includes a dome-shaped cap member having an interior side thereof, and a mounting assembly having a guide portion affixed to the cap member, and a guide base slideably mounted to the guide portion for movement thereof along a fixed path between a first position and a second position. The hat assembly further includes a clip device configured for releasable attachment to a user's clothing, and an elongated flexible tether having one portion thereof mounted to the clip device, and another portion thereof mounted to the guide base. Thus, when the guide base moves along the fixed path between the first position and the second position, the one portion of the tether and the clip device move between a retracted condition and an extended condition, enabling the clip device to be mounted to the user's clothing.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawing, in which:

DETAILED DESCRIPTION OF THE INVENTION

Figure 1:
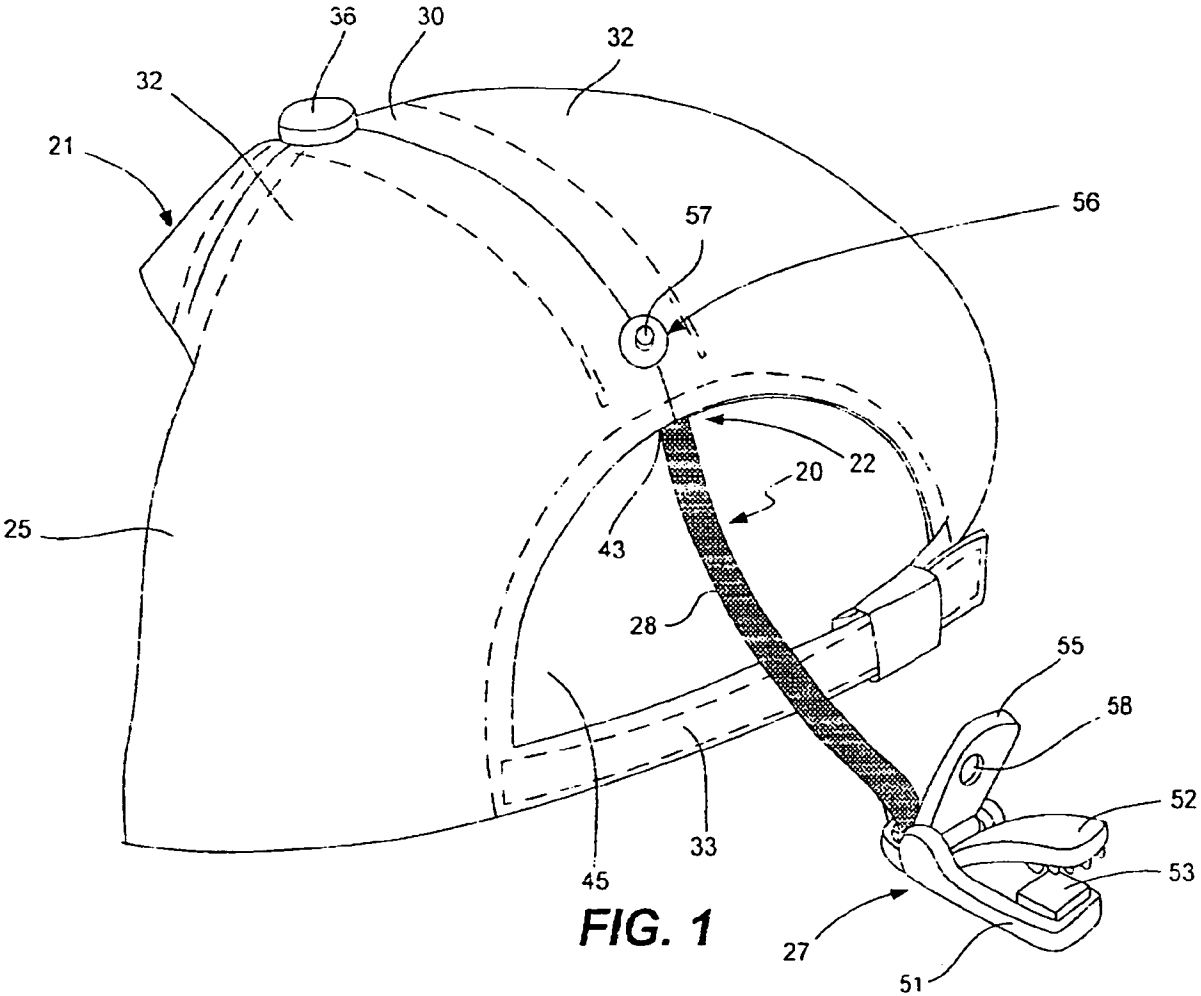
FIG. 1 is a fragmentary, top rear perspective view of a sports cap incorporating a retractable tether apparatus constructed in accordance with the present invention, illustrated in an extended position.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Figure 2:
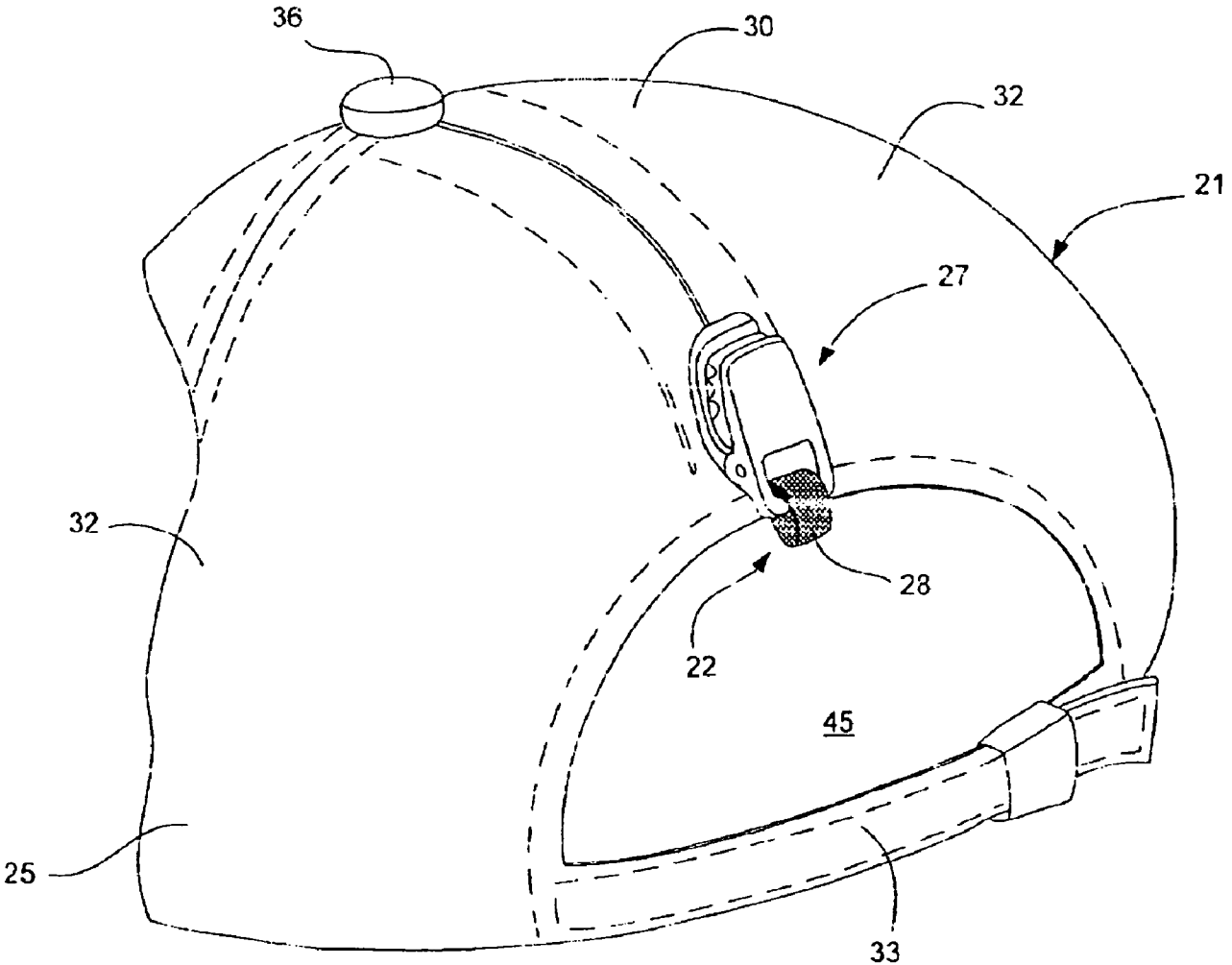
FIG. 2 is a fragmentary, top rear perspective view of the sports cap and retractable tether apparatus of FIG. 1, in a retracted position.
Figure 3:
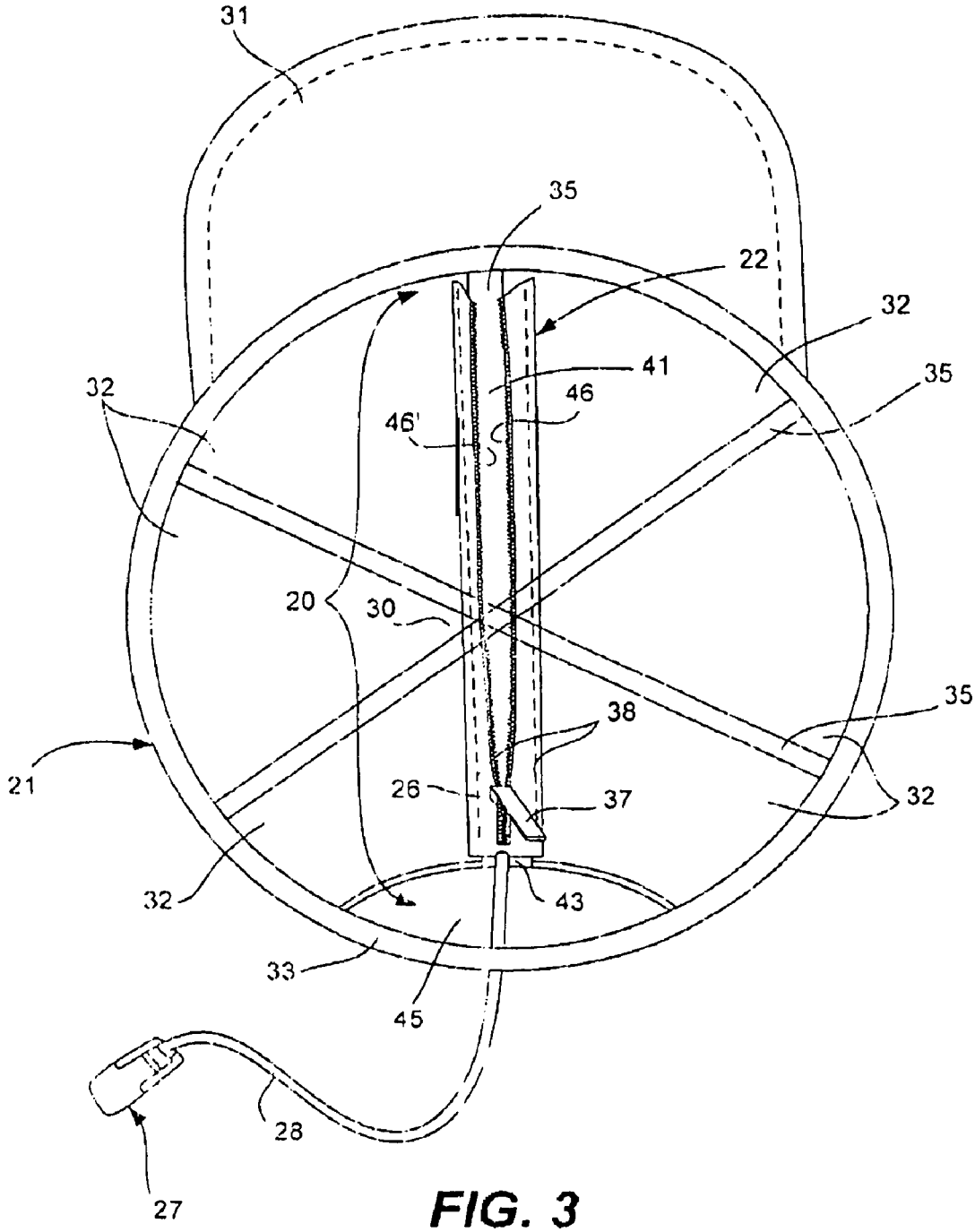
FIG. 3 is a bottom plan view of the sports cap and retractable tether apparatus of FIG. 1, in the extended position.
Figure 4:
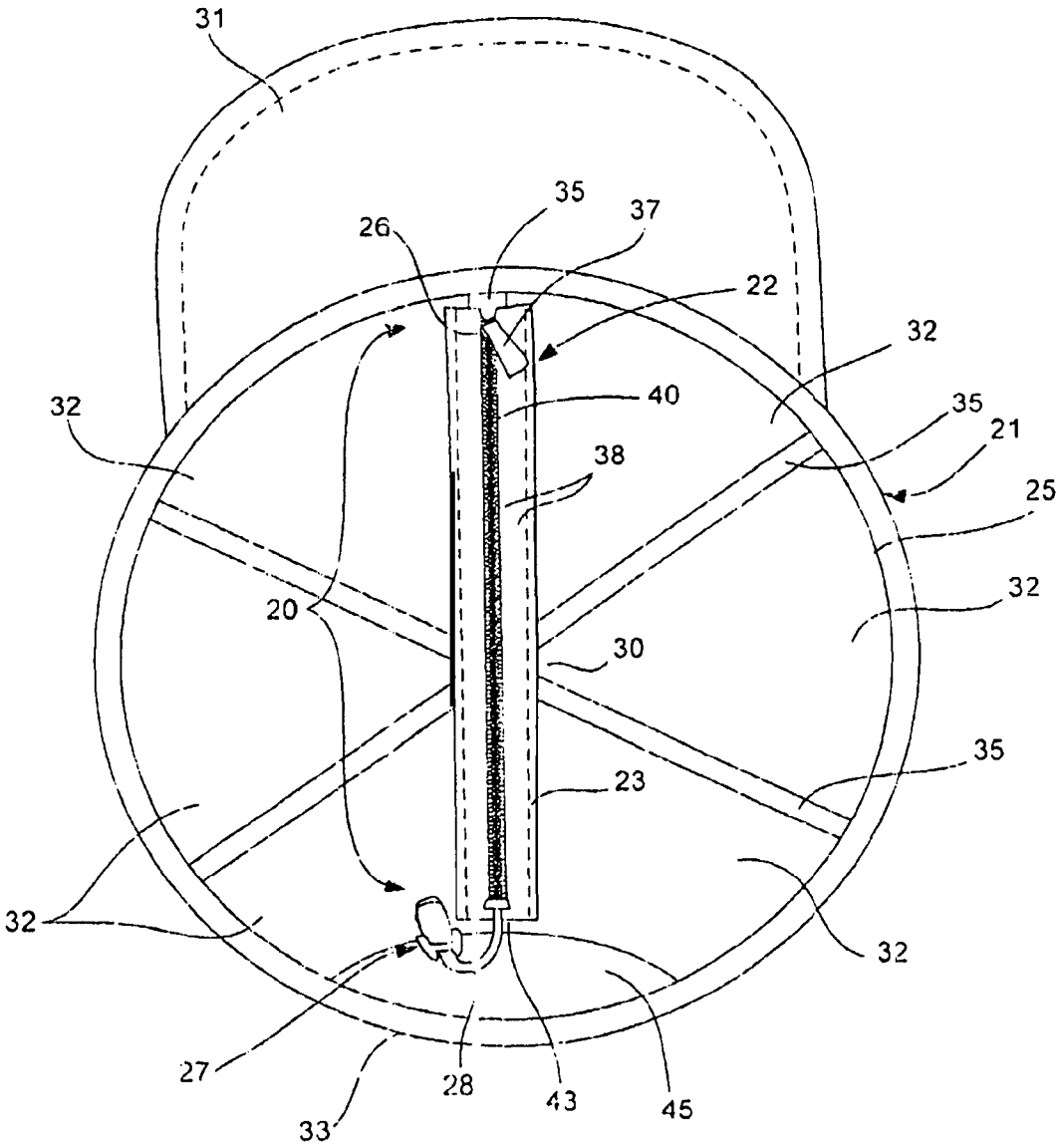
FIG. 4 is a bottom plan view of the sports cap and retractable tether apparatus of FIG. 1, in the retracted position.
Figure 5:
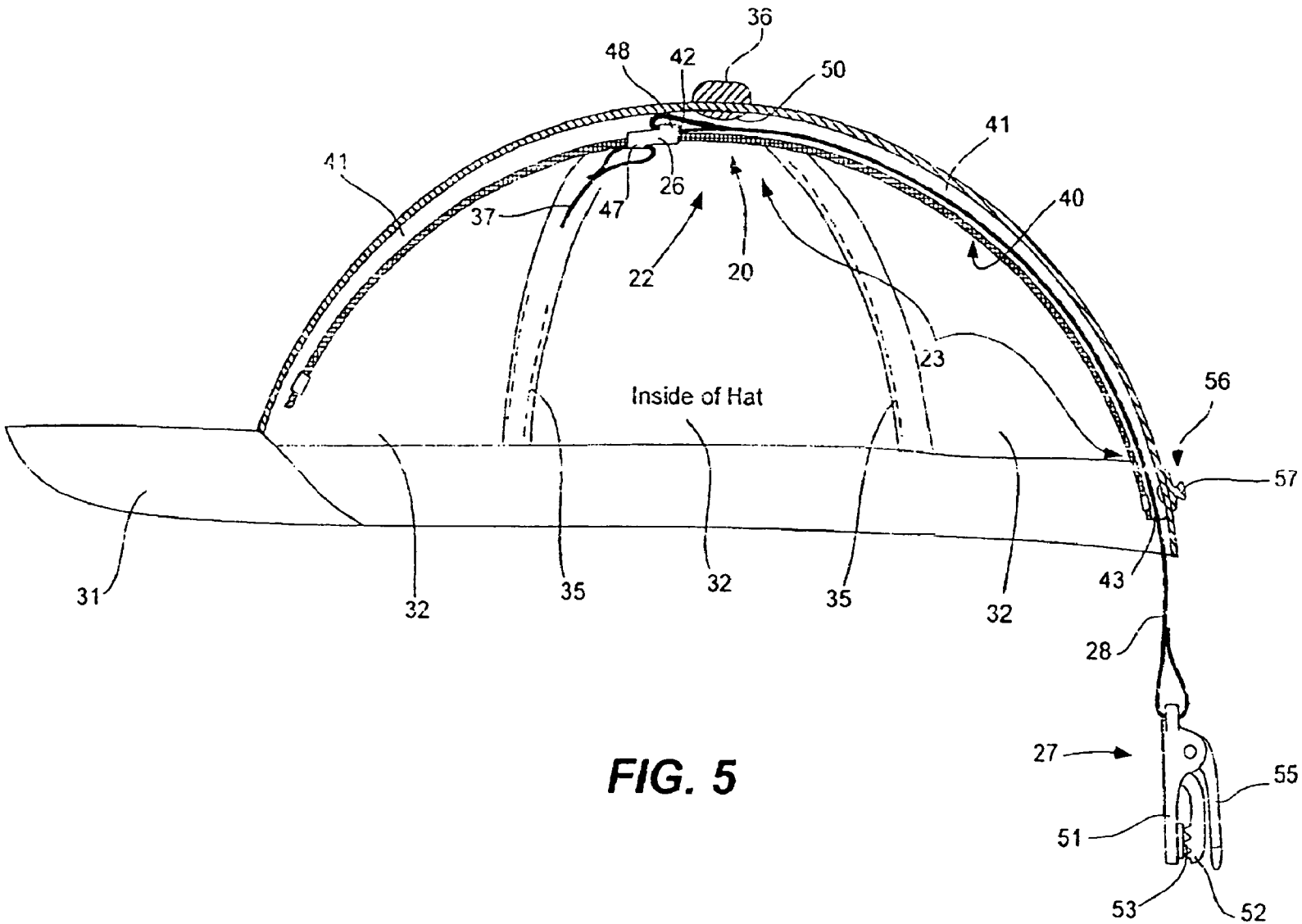
FIG. 5 is an enlarged, side elevation view, in cross section, of the sports cap and retractable tether apparatus of FIG. 4.

Referring now to FIGS. 1-4, a retractable hat tether apparatus, generally designated 20, is provided which functions to releasably retain a hat 21 to a user thereof. The tether apparatus 20 includes a mounting assembly, generally designated 22, having a guide portion 23 adapted to affix to the cap portion 25. The mounting assembly 22 further includes a guide base 26 movably mounted to the guide portion for movement thereof along a fixed path between a, first position (FIG. 3) and a second position (FIGS. 4 and 5). The tether apparatus 20 further includes a clip device 27 that is configured for releasable attachment to the user's clothing. A flexible tether 28 is provided having one portion of the tether 28 mounted to the clip device 27, while another portion of the tether is mounted to the guide portion. The apparatus is structured such that when the guide base 26 moves along the fixed path between the first position and the second position, the one portion of the tether and the clip device move between an extended condition (FIGS. 1 and 3) and a retracted condition (FIGS. 2, 4 and 5), respectively. In the retracted condition, the guide base 26 and the tether 28 cooperate to position the tether along the fixed path. In the extended condition, in contrast, the tether is extended from the hat to enable the clip device 27 to be mounted to the user's clothing.

Accordingly, in the retracted condition, the guide portion and the guide base of the mounting assembly cooperate to position the retractable hat tether along the fixed path adjacent the cap. As shown in FIGS. 2 and 4, in this position, the tether does not freely hang or dangle about the hat to prevent entanglement. A much more organized and cleaner appearance is provided as compared to most current head wear tether devices.

It will be appreciated that the present invention may be utilized with any headwear without departing from the true spirit and nature of the present invention. The present invention, however, is only illustrated and incorporated into one specific style of headgear (i.e., a conventional sports cap). Typically, these sports caps 21 include a crown portion 30 adapted to fit a wearer's head. This portion is generally fabricated by sewing together six material cloth pieces 32 each cut to have substantially a triangle shape. As in the case of a conventional cap, a sunshade or visor 31 is mounted to a front lower edge section of the crown portion 30. Further, an size adjusting device 33 is mounted to a rear lower edge section of the crown for adjusting the size of the cap. This is typically provided by an elastic band, a belt or opposed non-elastic bands with a VELCRO®-type or snap-type fastener.

To reinforce the seams of the crown portion 30, three tapes 35 are often stitched along the seams of the material cloth pieces 32 to cross a top button 36 mounted at the central portion of the crown portion 30 in the front to back direction and in the right and left diagonal directions. Not only do these tapes 35 reinforce the seams, but also serve to maintain the shape of the crown portion 30.

In one specific embodiment of the present invention, the mounting assembly 22 integrates smoothly within one of the reinforcement tapes strips. In this manner, the appearance is minimally altered from conventional cap structures, although such integration is not necessary for performance of the tether apparatus 20. More particularly, as best shown in FIGS. 3-5, the guide portion 23 of the mounting assembly extends about the crown portion 30 from a back side of the cap portion 25 to a front side thereof, defining the fixed path along the crown portion. Since the mounting assembly is preferably mounted to an interior side of the cap portion 25, as opposed to an exterior side thereof, the retraction of the tether dangle during hat use will be even more apparent. Exterior mounting of the tether apparatus, however, is an option.

Figure 6:
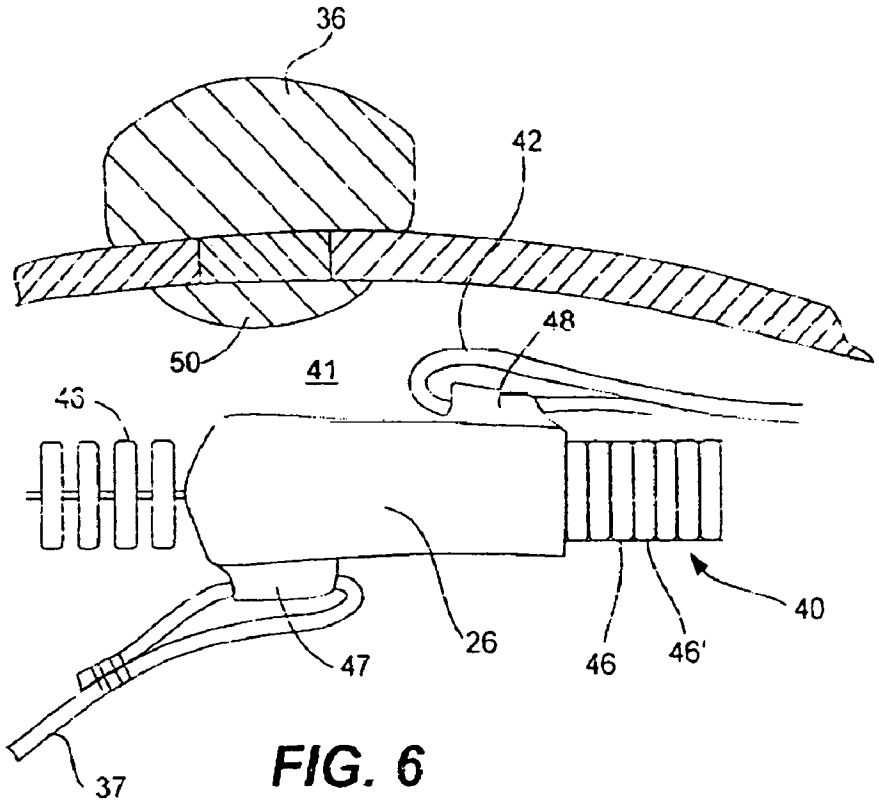
FIG. 6 is an enlarged, fragmentary, side elevation view, in cross section, of a guide track and guide base of the retractable tether apparatus of FIG. 5.

A pull tab 37 is included that is mounted to the guide base 26 of the mounting assembly 22 to facilitate manual manipulation thereof between the first position and the second position. Moreover, as best illustrated in FIGS. 5 and 6, the first end 42 of the tether 28 is mounted to the guide base 26, as well. Accordingly, as the guide base 26 is manually moved or pulled along the guide portion 23 of the mounting assembly between the first and second positions, the flexible tether 28 is drawn along the fixed path which in turn moves the clip device 27 between the extended (FIGS. 1 and 3) and retracted conditions (FIGS. 2, 4 and 5), respectively.

The tether 28 is preferably composed of a relatively flexible non-elastic material that provides sufficient tensile strength. Such flexibility is required to permit mounting of the clip device 27 to the user's apparel, when oriented in the extended condition, while being capable of conforming to the profile of the cap portion 25, along the fixed path, when the tether 28 is moved to the retracted condition. Many cord or strap materials can be satisfactorily employed such as rope, twine, plastic, nylon, and other fabrics. One specific example of the tether material is a tether ribbon composed of fabric. While a non-elastic tether material is preferred, an elastic material can be employed, however.

Turning now to FIGS. 2 and 3, the guide portion 23 includes a guide support 38 that supports a guide track 40 upon which the guide base 26 is movably mounted. The guide support 38 is comprised of an elongated, rectangular material having sufficient flexibility to conform to the curvature or profile of the cap portion 25 of the hat. The guide track 40, similarly is composed of a material sufficiently flexible to enable conformance of the guide track to the curvature or profile of the cap portion 25, yet provide sufficient rigidity and support to enable the guide base 26 to move, slide and/or track therealong. Such materials include virtually any type of fabric.

To accommodate and retain the flexible tether along the fixed path, the guide portion 23 cooperates with the cap portion 25 to form an elongated pocket 41 extending substantially along the fixed path between the first position and the second position. This pocket 41, as best viewed in FIGS. 3-5, is sized and dimensioned to slideably receive into and deliver therefrom the tether 28, mounted at the first end 42 to the guide base 26, as the guide base reciprocates along the guide track 40.

The elongated pocket 41 is created along the fixed path by fastening the opposed longitudinal edge portions of the rectangular guide support 38 to the cap portion 25. As indicated, the opposed edges of the guide portion are affixed to the corresponding edges of one tape piece 32 of the cap. At one end of the pocket is an opening 43 into the pocket 41 that is formed to receive into and deliver therefrom the tether as the guide base moved along the guide track 40. This pocket opening 43 is preferably positioned at the distal end of the pocket 41, delivering the tether into a bay portion 45 of the cap portion formed between a rear peripheral edge thereof and the size adjusting device 33 of the hat.

Accordingly, as the guide base 26 is manually moved, via pull tab 37, along fixed path of the guide track from the second position, where the tether 28 is in the corresponding retracted condition (FIGS. 2, 4 and 5), to the first position, where the tether is in the corresponding extended condition (FIGS. 1 and 3), the tether is delivered from storage in the pocket 41 through the pocket opening 43. Another technique to deliver the tether is by simply pulling on the clip device 27, which in turn draws the tether through the pocket opening 43 to the retracted condition, and displaces the guide base 26 from the first position to the second positions. This provides a sufficient extension or length of tether ribbon to enable mounting of the clip device 27 to the user's clothing for hat retention.

During periods of non-use, the tether 28 can be retracted back into the pocket 41 through the pocket opening 43. This is performed by manually manipulating the guide base 26, via pull tab 37. By pulling the guide base along the guide track from the first position (FIGS. 1 and 3) to the second position (FIGS. 2, 4 and 5), the tether 28 which is attached to the guide base 26 at the one end, is pulled and retracted back through the pocket opening 43 and along the fixed path of the pocket 41 toward the retracted condition.

It will be understood that the extension length of the tether 28 can be controlled by the length of the fixed path for the first position to the second position. For example, should the guide portion 23 of the mounting assembly only extend from the top of the crown portion 30 to the bay portion 45 of the cap 21, the extension length of the tether 28 from the retracted condition to the extended condition will be proportionately shortened. Thus, depending upon the application, the tether extension can be adjusted accordingly.

In accordance with the present invention, as the head or guide base 26 of the mounting assembly moves, slides and/or ratchets along the guide portion 23, the tether is retained along the fixed path, substantially eliminating tether dangle. The guide portion, in one specific embodiment, is provided by a rail-type structure that cooperates with the guide base 26 to move both the guide base and the one end of the tether along the fixed path. In one example, a ratchet type structure maybe provided that locks the guide base along the fixed path between the first position and the second position unless the guide base, and hence the tether, is released. Other sliding-type device suitable for use along the guided fixed path include plastic zippers, and enclosed glide and pull devices.

More specifically, the example illustrated in FIGS. 2, 3 and 5 represent a conventional zipper style mechanism as the mounting assembly. The guide track 40, thus, is provided by the zipper teeth or chain portion of a zipper, while the guide base 26 is provided by a zipper slider. Thus, when the zipper slider slides or tracks along the zipper teeth 46, 46' between the first position (FIGS. 1 and 3) and the second position (FIGS. 2, 4 and 5), the tether ribbon 28 is moved between the extended condition and the retracted conditions, respectively.

The pull tab 37 or the like is included mounted to a lower bracket 47 of the zipper slider for manual manipulation of the zipper between the first position and the second position. Similarly, the first end 42 of the tether ribbon 28 is mounted to an upper bracket 48 of the zipper sliders. As best viewed in FIGS. 5 and 6, the first end of the tether ribbon 28 extend over the upper bracket 48. This is advantageous in that the tether ribbon functions as a ramp portion to facilitate unobstructed passage of the zipper upper bracket 48 past the rivet 50 of the cap button 36 of hat 21.

In this particular sample, when the guide base 26 (e.,Z. zipper slider) is moved to the first position, retracting the tether into the pocket 41, the zipper mechanism is zipped or closed. In contrast, when the zipper slider is moved to the second position, delivering the tether from the pocket 41, the zipper mechanism is unzipped or opened.

Figure 7:
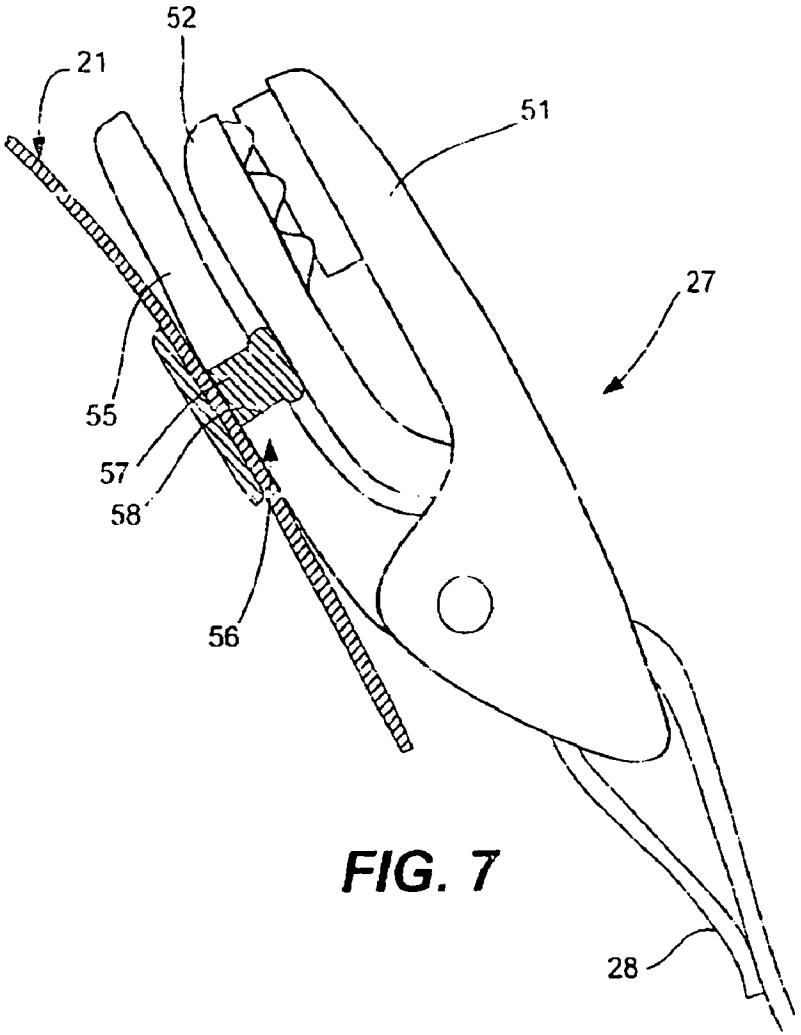
FIG. 7 is an enlarged, fragmentary, side elevation view of a clip device of retractable tether apparatus of FIG. 5, fastened to the sports cap through a clip fastener of the present invention.

Referring now to FIGS. 1, 2 and 7, the clip device is described in greater detail. This mechanism may be provided by any clip capable of releasable attachment to a user's clothing. These include virtually any type of manual clip with opposed jaws. Such examples include alligator clips, copy holding clips, and plastic paper gripping devices. In the illustrated embodiment, a suspender-style clip is provided capable of locking to the user's clothing. A lower jaw 51 and an upper jaw 52 are hingably mounted to one another. Each jaw 51, 52 includes corresponding gripping teeth 53 to facilitate mounting to the clothing. A lock lever 55 is also included movable between an unlocked position (FIG. 1) and a locked position (FIG. 7). Accordingly, in the unlocked position, the upper and lower jaws 52, 51 can be positioned apart so that the teeth can be placed about the user's article of clothing. By manipulating the lock lever to the locked position, the opposed jaws will clamp down on the clothing.

In one alternative configuration, the clip device 27 may include a clip fastener, generally designated 56, configured to releasably mount the clip device to the cap portion 25 when the tether is in the retracted condition. Thus, during non-use, the clip will be secured to the cap and will not dangle freely as well. As best illustrated in FIGS. 1 and 7, the fastener 56 is provided by a snap mechanism which includes a snap post 57 mounted to the cap portion 25. The upper jaw 52 includes an aperture 58 therethrough configured to receive the snap post 57.

The snap post 57 and mating aperture 58 are sized and dimension to friction fit to one another in a manner retaining the clip device thereto. In this manner, the clip device 27 can be selectively secured to the cap portion 25 during non-use. To remove the clip device for use, the user may simply pull on the clip device by an amount sufficient to separate the snap post 57 from the receiving aperture 58 in the upper jaw. It will be appreciated that the clip device may support the snap post 57, while an eyelet or the like may be supported by the cap portion. Moreover, other conventional snap devices or releasable fasteners may be applied such as VELCRO® or the like.

Although only a few embodiments of the present inventions have been described in detail, it should be understood that the present inventions may be embodied in many other specific forms without departing from the spirit or scope of the inventions.

What is claimed is:

1. A retractable hat tether apparatus for a hat having a cap portion, said tether [device] *apparatus* comprising:

a *zipper mechanism mounted to the cap portion, and having a* guide base [configured to movably mount to said cap portion for movement thereof] *movable* along a fixed path between a first position, *proximal one end of the zipper mechanism,* and a second position, *proximal an opposite end of the zipper mechanism*;

a flexible tether having a first end and an opposite second end thereof mounted to said guide base, *said tether having a length similar to the length of travel of said guide base along the fixed path between the first position and the second position*; and a clip device configured for releasable attachment to a user's clothing, said clip device being mounted to said first end, wherein when said guide base moves along the fixed path between said first position and said second position, said tether and said clip device move between a retracted condition, positioning said tether substantially along the fixed path, and an extended condition, positioning said tether at an exterior of said cap portion to enable the clip device to be mounted to said user's clothing.

2. The tether apparatus according to claim 1, further including:

a guide device configured to mount to said cap portion along said fixed path, and adapted to cooperate with said guide base for guided movement thereof along the fixed path between the first position and the second position.

3. The tether apparatus according to claim 2, wherein said guide device [cooperates with said cap portion to form] *forms at least a portion of* a pocket upon which a substantial portion of said tether retracts into said pocket in said retracted condition, when said base is moved to said first position.

[4. The tether apparatus according to claim 3, wherein the length of said tether is similar to the length of travel of said base along the fixed path from the first position to the second position.]

[5. The tether apparatus according to claim 3, wherein said guide device and said guide base cooperate to form a zipper mechanism.]

6. The tether apparatus according to claim [3] *2*, wherein said guide device is affixed to an interior side of the cap portion.

[7. The tether apparatus according to claim 6, wherein said guide device and said guide base cooperate to form a zipper mechanism.]

8. The tether apparatus according to claim 3, wherein said guide device extends substantially from a frontside of said cap portion to a rearside of said cap portion.

9. The tether apparatus according to claim [8] *2*, wherein said guide device further extends substantially [through a crown of] *along* said cap portion.

[10. The tether apparatus according to claim 1, further including:

a pull tab member mounted to said guide base for manual manipulation of said guide base along said fixed path.]

11. The tether apparatus according to claim 1, further including:

a snap device [configured to mount] *mounted* to said cap portion, and adapted to cooperate with said clip device for releasable mounting thereof to said cap portion.

[12. The tether apparatus according to claim 11, wherein said snap device includes a snap post sized and dimensioned to snap fit through a slot in said clip device.]

13. A retractable hat tether apparatus for a hat having a cap portion *with an interior surface*, said tether [device] *apparatus* comprising:

a mounting assembly having a *flexible* guide portion [adapted to affix] *mounted* to the cap portion[,] and *configured to conform substantially to the shape of the cap interior surface upon which said guide portion is mounted;* a guide base movably mounted to said guide portion for movement thereof along a fixed path between a first position and a second position;

a clip device configured for releasable attachment to a user's clothing; and a flexible tether *having a length at least as long as the length of travel of said guide base along the fixed path between the first position and the second position, said tether* having one portion thereof mounted to the clip device, and another portion thereof mounted to said guide base such that when said guide base moves along the fixed path of said guide portion, between said first position and said second position, said one portion of said tether and said clip device move between a retracted condition and an extended condition, enabling the clip device to be mounted to said user's clothing.

14. The tether apparatus according to claim 13, wherein said guide portion [cooperates with said cap portion to form] *forms at least a portion of* an elongated pocket upon which a substantial portion of said tether retracts into said pocket in said retracted condition, when said guide base is moved to said first position.

[15. The tether apparatus according to claim 14, wherein the length of said tether is similar to the length of travel of said guide base along the fixed path between the first position and the second position.]

16. The tether apparatus according to claim 14, wherein said guide portion is affixed to an interior side of the cap portion.

17. The tether apparatus according to claim 16, wherein said guide portion extends substantially from a frontside of said cap portion to a rearside of said cap portion.

[18. The tether apparatus according to claim 17, wherein said guide portion further extends substantially through a crown of said cap portion.]

[19. The tether apparatus according to claim 17, wherein said mounting assembly is in the form of a zipper mechanism.]

[20. The tether apparatus according to claim 13, further including:

a pull tab member mounted to said guide base for manual manipulation of said guide base along said fixed path.]

[21. The tether apparatus according to claim 13, further including:

a snap device configured to mount to said cap portion, and adapted to cooperate with said clip device for releasable mounting thereof to said cap portion.]

22. The tether apparatus according to claim [21, wherein] *13, further including:*

[said] *a* snap device [includes a snap post sized and dimensioned to snap fit through a slot in said clip device] *mounted to said cap portion, and adapted to cooperate with said clip device for releasable mounting thereof to said cap portion.*

23. A hat assembly comprising:

a dome-shaped cap member having an interior side thereof:

a mounting assembly having a *flexible* guide portion affixed to the cap member[,] and *configured to conform substantially to the shape of a cap interior surface upon which said guide portion is mounted;* a guide base movably mounted to said guide portion for movement thereof along a fixed path between a first position, *proximal one end of the guide portion* and a second position, *proximal an opposite end of the guide portion, said guide portion forming an elongated pocket extending substantially along the fixed path*;

a clip device configured for releasable attachment to a user's clothing; and an elongated flexible tether having one portion thereof mounted to the clip device, and another portion thereof mounted to said guide base such that when said guide base moves along the fixed path between said first position and said second position, said one portion of said tether and said clip device [move] *moves* between a retracted condition, *upon which a substantial portion of said tether retracts into said pocket when said guide base is moved to said first position,* and an extended condition, enabling the clip device to be mounted to said user's clothing.

[24. The hat assembly according to claim 23, wherein said guide portion cooperates with said cap member to form an elongated pocket upon which a substantial portion of said tether retracts into said pocket in said retracted condition, when said guide base is moved to said first position.]

25. The hat assembly according to claim [24] *23*, wherein the length of said tether is similar to the length of travel of said guide base along the fixed path between the first position and the second position.

26. The hat assembly according to claim [24] *23*, wherein said guide portion is affixed to the interior side of the cap member.

27. The hat assembly according to claim 26, wherein said guide portion extends substantially from a frontside of said cap member to a rearside thereof.

[28. The hat assembly according to claim 27, wherein said guide portion further extends substantially through a crown portion of said cap member.]

29. The hat assembly according to claim [27] *23*, wherein said mounting assembly is in the form of a zipper mechanism.

[30. The hat assembly according to claim 23, further including:

a pull tab member mounted to said guide base for manual manipulation of said guide base along said fixed path.]

31. The hat assembly according to claim 23, further including:

a snap device configured to mount to said cap member, and adapted to cooperate with said clip device for releasable mounting thereof to said cap member.

[32. The hat assembly according to claim 31, wherein said snap device includes a snap post sized and dimensioned to snap fit through a slot in said clip device.]

*33. A retractable tether apparatus for headwear having an interior surface, said tether apparatus comprising:*

*a flexible guide portion mounted to said headwear and configured to conform substantially to the shape of the headwear interior surface upon which said guide portion is mounted;*

*a guide base movably mounted to said guide portion for movement thereof along a fixed path between a first position, proximal one end of the guide portion, and a second position, proximal an opposite end of the guide portion;*

*a flexible tether having a first end and an opposite second end thereof mounted to said guide base, said tether having a length similar to the length of travel of said guide base along the fixed path between the first position and the second position; and*

*a device mounted to said first end,*

*wherein when said guide base moves along the fixed path between said first position and said second position, said tether and said device move between a retracted condition, positioning said tether substantially along the fixed path, and an extended condition, positioning said tether substantially at an exterior of said headwear to enable operative access to said device.*

*34. The tether apparatus according to claim 33, wherein*

*said guide portion forms at least a portion of a pocket upon which a substantial portion of said tether retracts into said pocket in said retracted condition, when said base is moved to said first position.*

*35. The tether apparatus according to claim 33, wherein*

*said guide portion and said guide base cooperate to form a zipper mechanism.*

*36. The tether apparatus according to claim 33, further including:*

*a coupling device mounted to said headwear and adapted to cooperate with said device for releasable mounting thereof to said headwear.*

*37. The tether apparatus according to claim 33, wherein*

*said device is a clip device.*

*38. A retractable tether apparatus for headwear comprising:*

*a zipper mechanism mounted to the headwear, and having a guide base movable along a fixed path extending between a first position, proximal one end of the zipper mechanism, and a second position, proximal an opposite end of the zipper mechanism; and*

*a flexible tether having a first end and an opposite second end thereof mounted to said guide base such that when said guide base moves along the fixed path, between said first position and said second position, said first end portion of said tether moves between a retracted condition and an extended condition, said tether having a length similar to the length of travel of said guide base along the fixed path between the first position and the second position.*

*39. The tether apparatus according to claim 38, wherein*

*said zipper mechanism includes a guide portion mounted to the headwear, said guide base being movably mounted to said guide portion for movement thereof along the fixed path between the first position and the second position.*

*40. The tether apparatus according to claim 39, wherein*

*said guide portion forms at least a portion of an elongated pocket extending substantially along the fixed path upon which a substantial portion of said tether retracts into said pocket in said retracted condition, when said guide base is moved to said first position.*

*41. The tether apparatus according to claim 38, further including:*

*a device mounted to the first end of said flexible tether.*

*42. The tether apparatus according to claim 41, wherein*

*said device is a clip device.*

*43. The tether apparatus according to claim 41, further including:*

*a coupling device mounted to said headwear and adapted to cooperate with said device for releasable mounting thereof to said headwear.*

*44. A headwear assembly comprising:*

*headgear mountable to a head of a user:*

*a mounting assembly having a flexible guide portion mounted to the headgear, and configured to conform substantially to the shape of an interior surface of said headgear upon which said guide portion is mounted;*

*a guide base movably mounted to said guide portion for movement thereof along a fixed path between a first position, proximal one end of the guide portion, and a second position, proximal an opposite end of the guide portion; and*

*an elongated flexible tether having a length similar to the length of travel of said guide base along the fixed path from the first position to the second position, said tether having one portion thereof, and an opposed another portion thereof mounted to said guide base such that when said guide base moves along the fixed path between said first position and said second position, said one portion of said tether moves between a retracted condition and an extended condition.*

*45. The headwear assembly according to claim 44, wherein said mounting assembly is in the form of a zipper mechanism.*

*46. The headwear assembly according to claim 44, wherein said guide portion cooperates with said headgear to form an elongated pocket upon which a substantial portion of said tether retracts into said pocket in said retracted condition, when said guide base is moved to said first position.*

*47. The headwear assembly according to claim 44, further including:*

*a device mounted to the one portion of said flexible tether.*

*48. The headwear assembly according to claim 47, wherein said device is a clip device.*

*49. The headwear assembly according to claim 44, further including:*

*a coupling device mounted to said headgear and adapted to cooperate with said device for releasable mounting thereof to said headgear.*

*50. A headwear assembly comprising:*

*headgear mountable to a head of a user:*

*a zipper mechanism having a guide portion affixed to the headgear, and a guide base movably mounted to said guide portion for movement thereof along a fixed path between a first position and a second position; and*

*an elongated flexible tether having one portion thereof, and an opposed another portion thereof mounted to said guide base such that when said guide base moves along the fixed path between said first position and said second position, said one portion of said tether moves between a retracted condition and an extended condition,*

*said guide portion cooperates with said headgear to form an elongated pocket extending substantially along the fixed path of the guide base from the first position proximal one end of the guide portion and the second position proximal an opposite end of the guide portion, upon which a substantial portion of said tether retracts into said pocket in said retracted condition, when said guide base is moved to said first position.*

*51. The headwear assembly according to claim 50, wherein the length of said tether is similar to the length of travel of said guide base along the fixed path between the first position and the second position.*

*52. The headwear assembly according to claim 50, further including:*

*a device mounted to the one portion of said flexible tether.*

*53. The headwear assembly according to claim 52, wherein said device is a clip device.*

*54. A retractable tether apparatus for headwear comprising:*

*a zipper mechanism having a guide portion mounted to the headwear, and having a guide base movably mounted to said guide portion along a fixed path extending between a first position, proximal one end of the zipper mechanism, and a second position, proximal an opposite end of the zipper mechanism; and*

*a flexible tether having a first end and an opposite second end thereof mounted to said guide base such that when said guide base moves along the fixed path, between said first position and said second position, said first end portion of said tether moves between a retracted condition and an extended condition,*

*said guide portion forming an elongated pocket extending substantially along the fixed path of the guide base from the first position proximal said first end of the zipper mechanism and the second position proximal said opposite end of the zipper mechanism, upon which a substantial portion of said tether retracts into said pocket in said retracted condition, when said guide base is moved to said first position.*

*55. The tether apparatus according to claim 54, further including:*

*a device mounted to the one portion of said flexible tether.*

*56. The tether apparatus according to claim 55, wherein said device is a clip device.*

* * * * *